Jan. 29, 1952     L. V. McCARTY     2,583,788
ADJUSTABLE FLUID METERING VALVE
Filed Dec. 17, 1947
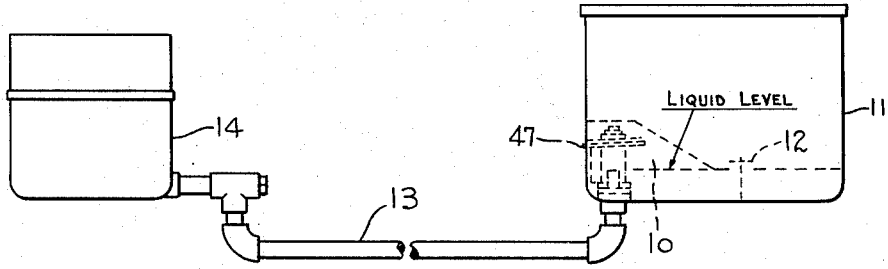
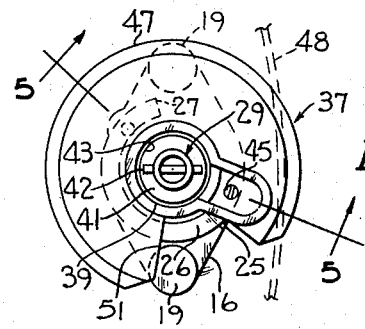
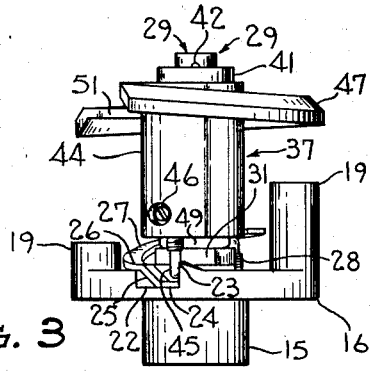
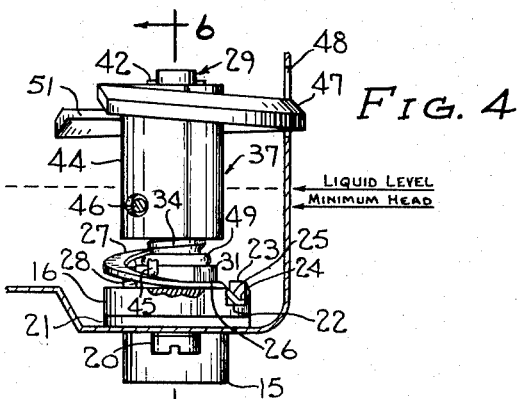
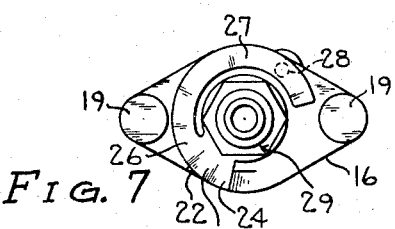
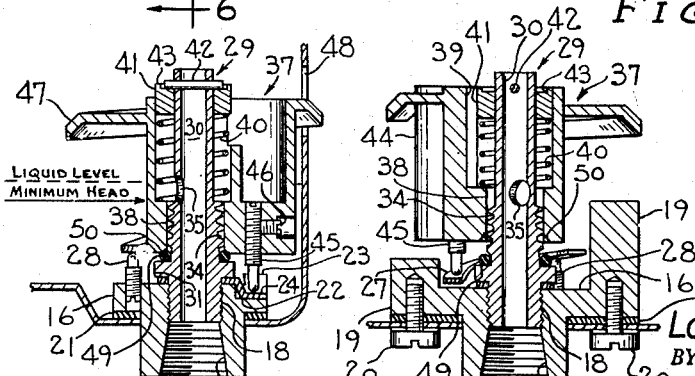
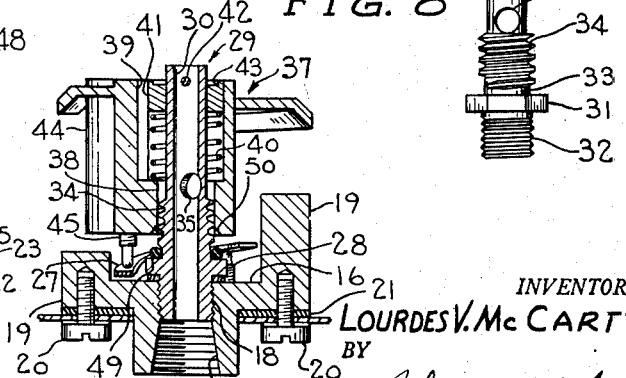
INVENTOR.
LOURDES V. Mc CARTY
BY
John W. Michael
ATTORNEY Patented Jan. 29, 1952

2,583,788

UNITED STATES PATENT OFFICE 2,583,788

ADJUSTABLE FLUID METERING VALVE

Lourdes V. McCarty, Milwaukee, Wis., assignor to A P Controls Corporation, a corporation of Wisconsin Application December 17, 1947, Serial No. 792,147

4 Claims. (Cl. 137—21)

This invention relates to improvements in adjustable fluid metering valves particularly of the type immersed and operable in sumps or constant level liquid reservoirs.

In valves of this type it is desirable to obtain a wide variation in the control of the flow of the fluid. For example, the flow must vary from an amount sufficient to support a pilot flame to an amount necessary to support a high fire flame. In previous valves this has been accomplished only by extensive relative movement of the valve parts or the incorporation of several distinct metering valves or single metering valves which have distinctly separate high and low control elements. Thus such prior valves have required a relatively large amount of space which limited their field of application and use. These are also costly and difficult to manufacture.

It is an object of this invention, therefore, to provide an adjustable fluid metering valve which will evenly control the flow of fluid over a wide range by relative adjustment of the metering parts less than that now required and which will also cut off all flow.

A further object of the invention is to provide an adjustable fluid metering valve which requires less operating space than similar capacity valves now require.

A still further object of the invention is to provide a rugged adjustable fluid metering valve which is readily and economically manufactured yet delicate and precise in its adjustability.

These objects are obtained by forming on the surface of one of two slidably engageable parts a metering groove which tapers in its depth so that its deep end is directly connected to an outlet. By relative movement of the engaging parts the groove may be entirely covered or merely opened a selected amount. When the groove is entirely covered it has a capillary action on fluid traveling therethrough. However, as the groove is progressively uncovered from the shallow end the capillary action is substantially lessened and eventually disappears. At the shallow end of the groove there is positioned a stop of resilient oil-resistant material against which the engageable parts abut to completely close off access by the fluid to the groove. Additional sensitivity of adjustment per unit of relative movement may be attained by placing the groove on a cylindrical surface in a helical path. Thus it requires only a slight relative movement of the engaging parts to greatly alter the rate of flow. The space required for the relative movement of the engaging parts is also cut to a minimum. Such relative movement may be controlled by rotation of one part with respect to the other while in contact with an adjustable cam. In the exemplification shown the part in which the groove and outlet are positioned is fixed relative to the sump. As the sump or reservoir has a fixed liquid level, such fixing of the outlet relative thereto maintains a substantially constant head.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a schematic view of a system including a source of fluid supply having a constant level sump in which a metering valve embodying the present invention may be positioned;

Fig. 2 is a top plan view of a metering valve embodying the present invention with a fragmentary portion of the sump shown for the sake of illustration;

Fig. 3 is a view in side elevation of the metering valve shown in Fig. 2 with the valve in closed position;

Fig. 4 is a view in side elevation of the metering valve shown in Fig. 2 but with the valve partially open and with parts broken away for the sake of clarity in illustration, a fragmentary portion of the sump being shown to illustrate the manner of securing the valve in the sump;

Fig. 5 is a sectional view taken on the line 5—5 of Fig. 2;

Fig. 6 is a sectional view taken on the line 6—6 of Fig. 4;

Fig. 7 is a plan view of the metering valve with the adjusting cover removed; and Fig. 8 is a view of the metering screw comprising one of the elements of the metering valve.

Referring to the drawings by reference numerals, the metering valve is immersed and operable in a source of liquid supply, the level of which is maintained constant as indicated. In the schematic diagram of Fig. 1 the valve is installed in a sump 10 of a barometric tank 11. A cut-off valve, indicated generally at 12, permits the liquid to flow from the barometric tank into the sump and maintain the liquid substantially at the level indicated. The metering valve is connected by customary pipe connections 13 to a burner 14 or other device which requires a controlled flow of liquid thereto.

The base of the metering valve is preferably made as a casting and has a cylindrical body 15 provided at its upper end with an extending flange 16. The flange 16 has two upwardly projecting pads 19 in which are tapped holes for receiving the screws 20 by which the pad and base are fastened to the bottom of the sump. To install the metering valve in a sump, the body 15 is inserted in an opening in the bottom of the sump and a gasket 21 is clamped between the flange and such bottom by the screws 20. One of the pads 19 is higher than the other to permit it to act as an abutment determining fully open position of the valve. A notch 22 is provided in the upper surface of the flange and a tooth-like projection 23 is adjacent such notch. These function to determine the "off" position of the valve. A central bore through the flange and body portion is provided with a standard pipe thread 17 at its lower end and a machine screw thread 18 at its upper end; the former enables the valve to be connected with device to be furnished with liquid and the latter holds the metering screw.

The cam for controlling the valve has an apertured hub which is fastened to the top of flange 16 by the metering screw 29 to hold the cam in place. A downwardly offset "off" flat 24 rests in the bottom of the notch 22 and also locates the cam. A steep incline 25 joins the "off" flat 24 to a "low" or pilot flat 26. Circumferentially extending from the pilot flat 26 is a sloping run 27, the slope of which may be varied by flexing it under the action of adjusting screw 28. The cam is made of hardened steel to be capable of withstanding wear and is sufficiently flexible to accomplish the desired adjustment.

The metering screw indicated generally at 29 is shown in detail in Fig. 8. It is preferably made from hexagonal brass stock provided with a central bore 30 which establishes a vent leading from the atmosphere above the level of the liquid in which the valve operates to the discharge opening of the valve. As the metering screw is formed, a hexagonal nut 31 is left adjacent its lower end to facilitate installation and provide a closure surface. The cylindrical part below the nut 31 is threaded at 32 to interengage in the screw thread 18 and hold the metering screw and cam firmly in place. The upper surface of the nut 31 is smooth and immediately thereabove there is provided a cylindrical portion 33 providing a seat for an O ring 49. Starting from the portion 33 there is a ten pitch right-hand tapered thread 34 having a substantially two and one-quarter inch taper per foot. The thread 34 is cut with the cutting portion of a tool perpendicular to its taper. After the thread is cut it is turned down so that its net diameter is constant throughout. The root diameter of the top or end of the thread 34 is substantially flush with an outlet 35 formed in the cylindrical wall of the top of the metering screw. A pair of pin holes 36 are provided in metering screw top to receive holding pin 42. An inspection of Fig. 8 reveals that the depth of the groove formed by the tapered thread 34 gradually increases from the bottom to the top thereof. Thus the cross sectional area of the groove gradually increases thereby providing a fluid guiding path from inlet to outlet which increases in cross sectional area from such inlet to the outlet.

In order to confine the flow of liquid to the fluiding guiding groove, and to vary the length thereof, a casing or cover, indicated generally at 37, is provided. The body of the cover 37 is provided with a bore 38 which slidably engages the outer diameter of the thread 34 to enclose any portion of the fluid guiding groove confined within such bore. The bore 38 is sufficiently long to confine the entire groove in the closed position of the valve. The cover extends above the level of the liquid in which the valve is designed to operate. A counterbore 39, extending between the bore 38 and the top of the cover 37, provides space for a coiled compression spring 40. The spring 40 acts between a guide 41 held in place on the metering screw 29 by the locking pin 42 and the cover 37 to urge it to closed position.

The locking pin 42 loosely fits in the pin holes 36 and is held in place therein by a small flange 43 on the guide 41. The continual pressure of spring 40 on guide 41 keeps it in contact with the pin 42 thus retaining the pin within the edge 43. The guide 41 also engages the counterbore 39 to form a slidable rotatable bearing for the upper end of the cover 37. The cover 37 has a laterally projecting portion 44 providing an abutment engageable with the tall pad 19 to limit clockwise (as viewed in Fig. 2) movement of the cover at the fully open position of the valve. This lateral projection also has a threaded opening in which a low flow or pilot adjusting screw 45 is threaded and locked as desired by a small locking screw 46.

As the regulation of the metering valve is obtained by the axial movement of the cover 37 with respect to the metering screw 29 and such axial movement is accomplished by a rotation of the cover, it is desirable to provide the cover 37 with a disk-like dial 47 the periphery of which extends beyond the lateral confines of the short width of flange 16 and projects through the slot 48 in the wall of a sump. It is also preferable to slope the dial to the horizontal in substantially the same degree as the pitch of the tapered thread 34. As so sloped, that part of its peripheral edge which extends through the slot 48 will not move up and down relative to the slot 48 in a substantial amount even though the cover 37 does rise and fall. Thus the adjustment of the cover may take place from the same point and will not require an unduly large slot.

A metering valve of this type will have a larger field of application if it is also able to cut off all flow. In the embodiment shown herein, a ring 49 of resilient oil-resisting material (sometimes referred to as an O ring) is forced downwardly over the threads 34 and rests snugly on the top of the nut 31 in the space 33 provided therefor. The lower opening of the bore 38 is provided with a chamfer at 50 and when the cover 37 is in its lower or "off" position the chamfer 50 will engage the O ring 49 and form a liquid seal preventing entrance to the liquid groove.

The "off" position is shown in Figs. 2 and 3. Such position is determined by the abutment between the tooth 23 and the low flow or pilot adjusting screw 45 as the cover 37 is rotated counter-clockwise. In this position the screw 45 is out of engagement with any portion of the cam and the spring 40 resiliently urges the cover into sealing engagement with the O ring 49. In order to regulate the valve to low flow or pilot position the disk 47 is rotated clockwise (as viewed in Fig. 2) until the bottom of the pin 45 rides up the incline 25 to the "low" flat 26. While on the flat 26 the locking screw 46 may be loosened and the low fire screw 45 adjusted through the top of the casing 37 until the desired low flow is obtained. When in this position the fluid is free to enter the liquid-guiding groove at its lower end. At this point of regulation such groove is of such cross sectional area and overall length that a capillary action is set up which sufficiently resists the flow of the liquid to control the low flow rate. To adjust the maximum flow or high fire and to regulate the rate of increase in the uncovering of the groove as rotary movement of the cover 37 takes place, the high flow screw 28 is raised or lowered to increase or decrease the slope of cam run 27. Usually such adjustments are made before installation particularly in the case of the high fire adjustment. No lock nut is necessary for the adjusting screw 28 as it is kept under considerable tension by the resiliency of the cam. Any desirable markings may be placed on the periphery of the dial 47 to show when it is in "off," "pilot" and "high" positions. As previously explained, however, the abutment between tall pad 19 and lateral projection 44 limits the rotation of casing 37 and thereby the upper limit.

As the fluid leaves the groove at its upper end it passes immediately to the discharge opening 35 and thence passes out of the metering valve into the connections 13. The fact that the metering screw has a central vent 39 permits free flow of the liquid after it leaves the discharge opening 35. It is preferable in installing the metering valve to adjust it in the sump so that the constant liquid level of the sump is between the center of the outlet 35 and its top. The minimum liquid head is thus determined by the bottom of the outlet 35. Regulation of the valve will be consistent over a wide range because there will be little change in the liquid head.

If it is found necessary to clean the valve and it is not practical to dissemble it from the sump, the dial 47, when in the position shown in Fig. 3, may be lifted until the screw 45 clears the top of the tooth 23. The cover 37 may then be swung counterclockwise (as viewed in Fig. 2) until the lateral projection 44 abuts against the tall pad 19. This will bring the open notch 51 in the dial in alinement with the inner wall of the sump and no part of the dial 47 will extend into slot 48. The guide 41 may then be depressed until flanges 43 underlie the pin 42 permitting its removal. Thereupon the guide 41, cover 47, and spring 40 may be moved up and off the metering screw 29 completely uncovering it for cleaning.

Although only one embodiment of the invention is shown and described herein, it will be understood that this application is intended to cover such changes or modifications as come within the spirit of the invention or scope of the following claims.

I claim:

1. A metering valve having a base adapted to be secured in an opening in the bottom of a sump or constant level fluid reservoir, a tube secured to said base having a vent therethrough with an opening above the level of liquid in the sump or reservoir and a discharge in said base, an outlet in the side of said tube above said base and substantially at the predetermined level of liquid in the sump, a valve seat on said base below said outlet, a spiral tapered thread on said tube extending from said seat to said outlet, a casing slidably revolvably mounted on said tube and engageable with said thread to form an enclosed pathway for fluid, the top of said casing projecting above the predetermined level of liquid in said sump, said casing in the closed position thereof cooperating with said seat to seal said thread from access by fluid in said reservoir, cam means for moving said casing to selected position above said seat to vary the length of said enclosed pathway, said cam means including a minimum and maximum open position adjustments, and a dial on said casing to control the rotation thereof, said dial being sloped in substantial conformity with the slope of said cam whereby the periphery of said dial may be maneuvered from a fixed place.

2. A metering valve comprising, in combination, an inner tubular member having external threads formed on a portion thereof, an outer tubular member having an inside diameter substantially equal to the outside diameter of said threaded portion and in contact with the threaded portion, said outer member serving as a cover for all or a desired amount of said threaded portion to define a flow path upon longitudinal adjustment of the members with respect to each other, cam means operable in response to relative rotation between the members to effect relative axial movement between the members, and means for adjusting said cam means to vary the axial movement obtained in response to a given relative rotation between the members including manual control means fixed on one of the members and having a slope substantially conforming to the slope of the cam means so that under all conditions a portion of the periphery of said control means lies adjacent a point fixed in space.

3. A metering valve adapted for use in a constant level tank comprising, in combination, a tubular member fixed in said tank and having helical threads formed on a portion thereof, an annular valve seat formed on said inner member below said threads, an outer tubular member having an inside diameter substantially equal to the outside diameter of said threads and cooperating with said threads to define a helical flow path, said outer member being movable into contact with said seat to close off said flow path, a cam track fixed with respect to said inner member, a cam follower on said outer member, and resilient means acting between the inner and outer members to urge said cam follower into contact with said cam track to effect relative axial movement between the members in response to relative rotation between the members.

4. A metering valve adapted for use in a constant level tank comprising, in combination, a tubular member fixed in said tank and having helical threads formed on a portion thereof, an outer tubular member having an inside diameter substantially equal to the outside diameter of said threads and cooperating with said threads to define a helical flow path, a cam track fixed with respect to said inner member, a cam follower on said outer member and riding on said cam track, said track and said follower being operative in response to relative rotation between the members to effect relative axial movement between the members, and manual control means fixed on one of the members and having a slope substantially conforming to the slope of the cam means so that a portion of the periphery of said control means lies adjacent a point fixed in space under all conditions.

LOURDES V. McCARTY.

REFERENCES CITED

The following references are of record in the file of this patent:

UNITED STATES PATENTS

| Number | Name | Date |
|---|---|---|
| 1,754,138 | Agee | Apr. 8, 1930 |
| 1,952,683 | Resek | Mar. 27, 1934 |
| 1,998,239 | Irwin | Apr. 16, 1935 |
| 2,158,737 | Wunsch | May 16, 1939 |
| 2,301,041 | Hann | Nov. 3, 1942 |
| 2,321,000 | Bennett | June 8, 1943 |

FOREIGN PATENTS

| Number | Country | Date |
|---|---|---|
| 52,552 | Denmark | of 1937 |
| 426,479 | Great Britain | of 1933 |
| 626,444 | Germany | of 1936 |